(12) United States Patent
Lassen et al.

(10) Patent No.: US 11,595,077 B2
(45) Date of Patent: Feb. 28, 2023

(54) FREQUENCY HOPPING IN SENSOR NETWORKS

(71) Applicant: Disruptive Technologies Research AS, Blomsterdalen (NO)

(72) Inventors: Terje Lassen, Blomsterdalen (NO); Karl Martin Gjertsen, Blomsterdalen (NO); Mads Westergreen, Blomsterdalen (NO); Sigve Tjora, Blomsterdalen (NO)

(73) Assignee: Disruptive Technologies Research AS

( * ) Notice: Subject to any disclaimer, the term of this patent is extended or adjusted under 35 U.S.C. 154(b) by 0 days.

(21) Appl. No.: 16/809,468

(22) Filed: Mar. 4, 2020

(65) Prior Publication Data

US 2022/0173766 A1  Jun. 2, 2022

Related U.S. Application Data

(60) Provisional application No. 62/813,437, filed on Mar. 4, 2019.

(51) Int. Cl.
*H04B 1/713* (2011.01)
*H04L 1/00* (2006.01)
*H04W 72/0453* (2023.01)

(52) U.S. Cl.
CPC .......... *H04B 1/713* (2013.01); *H04L 1/0061* (2013.01); *H04W 72/0453* (2013.01)

(58) Field of Classification Search
CPC . H04W 72/082; H04W 4/70; H04W 52/0206; H04W 56/0015; H04W 72/0446; H04W 72/0453; H04W 72/0486; H04W 84/20; H04W 84/18; H04W 88/16; H04B 17/318; H04B 1/713; Y02D 30/70; H04L 1/0061

See application file for complete search history.

(56) References Cited

U.S. PATENT DOCUMENTS

| 7,020,701 | B1 | 3/2006 | Gelvin et al. | |
| 2003/0086406 | A1* | 5/2003 | Batra | H04B 7/2628 375/132 |
| 2007/0093975 | A1 | 4/2007 | Hoogenboom | |
| 2009/0022073 | A1 | 1/2009 | Batra et al. | |

(Continued)

OTHER PUBLICATIONS

Communication from the European Patent Office for European Patent Application No. 20161024.3, 6 pages.

*Primary Examiner* — Dady Chery

(74) *Attorney, Agent, or Firm* — Onyx IP Group

(57) ABSTRACT

Systems and methods for facilitating compliance with FCC frequency hopping requirements are described. The described innovations may be used to facilitate frequency hopping in a sensor network having a network link with two endpoints, those endpoints comprising a master and a slave, wherein the slave comprises a server and the master comprises a sensor, and wherein the slave transmits one message in response to each master message on the link. All communication over the link may be initiated by the master terminal, requiring only one return message per transmission. A channel to be used for a following reception from the slave terminal is specified at the master, and the specified channel is transmitted from the master to the slave terminal. The slave terminal then uses the specified channel for its next transmission.

16 Claims, 2 Drawing Sheets

(56) References Cited

U.S. PATENT DOCUMENTS

2010/0008272 A1\* 1/2010 Messinger .............. H04Q 9/00
                                                                  370/311
2013/0242905 A1   9/2013 Rasband et al.
2017/0055104 A1\* 2/2017 Wegelin .............. H04W 72/082

\* cited by examiner

FREQUENCY HOPPING IN SENSOR NETWORKS

RELATED APPLICATION

This application claims priority to U.S. Provisional Application Ser. No. 62/813,437 filed on Mar. 4, 2019, entitled Frequency Hopping in Sensor Networks, and incorporates the same by reference in its entirety for all that it teaches, discloses and suggests, without exclusion of any portion thereof.

TECHNICAL FIELD

The present disclosure is related generally to frequency hopping and, more particularly, to systems and methods for facilitating compliance with FCC frequency hopping requirements.

BACKGROUND

The frequency band 902-928 MHz is available for use in the United States by the Federal Communications Commission (FCC) for license-exempt operation of wireless communications that are compliant with the stated regulations. This is of course attractive for IoT (Internet of Things) applications, like sensor networks. Provisions for fixed-frequency operation are given in § 15.249 of the FCC regulations, published via e-CFR.

The permissible radiated power of about −1 dBm is too low to allow use of available power in most devices. To achieve high communication range, it is desirable to be compliant with the high-power alternative in § 15.247 of the FCC, requiring spectrum spreading, published in e-CFR.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Figure 1:
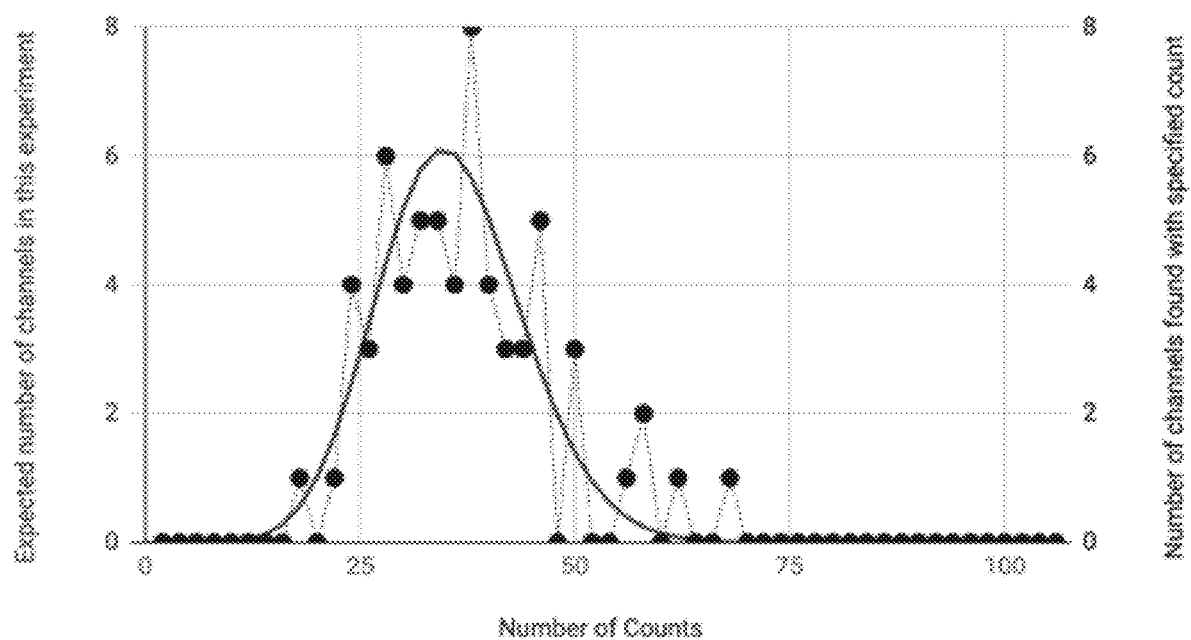
FIG. 1 is a plot showing expected and found channel counts in accordance with an embodiment of the disclosed principles.

Before discussing embodiments of the disclosed principles in full detail, an overview of certain embodiments is given to aid the reader in understanding the later more detailed discussion. As noted above, the provisions for permissible radiated power of about −1 dBm is too restrictive to allow use of available power in most devices. To achieve high communication range, it is desirable to be compliant with the high-power alternative in § 15.247 of the FCC, requiring spectrum spreading, published in e-CFR.

To allow a sensor to operate under these provisions, transmission in both directions must comply with regulations. Many sensors will be very small and have limited energy available, such that it may operate in compliance with the low-power regulations in § 15.249 without limiting its capabilities. A solution for such sensors may be to use below −1 dBm radiated power for the sensor transmission, and the high-power alternative in the other direction.

Use of digital spectrum spreading is attractive when the spreading factor is low enough not to noticeably degrade receiver sensitivity. This enables two-way communication at high power. For low-rate connections, spectrum spreading by frequency hopping at narrow channels is allowed with limited duration for use of each frequency. It is required that the channels in use are visited in a randomized pattern, with equal use of all channels.

This is suitable for systems sending short messages, like sensor networks. For low-power sensors, it is important to find solutions with minimum added energy usage for management of the hopping scheme. Known solutions require more energy than acceptable in many cases.

A solution with very low overhead for frequency hopping can be made if the communication protocol defines one end of the link to be master and the other to be a server (slave) that transmits one message (or a limited number) as response to each master message. The server may relay all traffic from the master to a higher level, like processing in a cloud application. A server may simply be a gateway defined as "Cloud Connector" herein.

Frequency hopping can be achieved by applying fast channel scanning in the receiver, such that whichever channel is used for transmission, the receiver is able to lock to the correct channel. The transmitter can then easily just step through a random sequence. This solution is quite demanding at the receiver side, and not compatible for use in a battery-operated sensor.

A different solution using synchronization between the transmitter and the receiver of the defined channel sequence enables transmission without a need for fast frequency scanning in the receiver. This solution requires a tracking or synchronization solution on the receiver end, as well as for acquisition when not synchronized. The required effort for sensors to stay synchronized renders the solution impractical.

Herein, for low-power sensors, we assume the sensor to be a master terminal while the server may be a Cloud Connector (gateway) or a device with more available power. In networks where the master terminal initiates all communication, requiring only one return message per transmission, frequency hopping can be implemented from the server end in a different way. That is, the master specifies, and transmits to the slave, the channel to be used for the following reception from the server. The master only needs to generate channel sequences with random sequence and equal probability for all channels. This helps reduce the energy usage in the master, which can now start its next reception at a known channel without further verification.

If more than one return message is allowed, the applied channels are taken from a randomized channel list, starting at the received list number. The master and server preferably keep identical lists for this type of operation. This approach does not require any acquisition or synchronization, as the server receives at a fixed frequency and the master always knows which channels to use based on the message from the master.

A particularly attractive alternative in accordance with a first embodiment is available if the master sends well encrypted messages with a CRC word of a sufficient length (=>6 bits). This invention is a solution where the server decodes the CRC message into a number that directly is used as the channel number for the return message. In this way the master can inform the sensor about the return channel number without transmitting extra data. The encryption and Message Integrity check (MIC) ensures that there is no correlation between the message content and the transmitted bit pattern, such that different messages will send randomized bit sequences.

The CRC process reports the remainder of a division process of the entire message, such that the random variation of message values is convoluted onto the CRC value, maintaining the random variation. This leads to equal probability for any value. A suitable range of equiprobable channel values can be generated from CRC by use of the modulo operation by arriving at a power-of-2 number like 64, leading to frequency hopping on 64 channels.

In this way, the master does nothing extra to send messages containing well random selected channel numbers for the frequency hopping of return messages. The only added work is the modulo operation on the generated CRC and storage of the value for the next reception. The transmitted message is not modified, so no extra energy is used to convey the message.

In a second, logically simplest embodiment, the master terminal uses a random number generator to give a value in the specified range before each transmission. This value is stored to be used at next reception and transmitted, adding a sufficient number of bits to the actual transmission. This results in a need to transmit extra data for each radio transaction. The server uses this value for its next transmission. The added length of the transmitted message from the master is the largest penalty for this solution.

In a third embodiment, the increased message length required for transmission of channel numbers in the second embodiment is removed if the integrity test of messages is relaxed. Instead of using e.g. 8 bit CRC, one may use only two bits for integrity test and still convey the channel numbers with the same packet length.

This may be acceptable if the end-to-end integrity check has a high level such as a 32 bit security Message integrity Check value (MIC). Compromised messages that go undetected by the 2-bit test may occasionally have a randomly distorted channel number that will be used for an unneeded return message. This may be acceptable if the error rate is kept low.

In a fourth embodiment, the avoidance of increased message length mentioned in the third embodiment may be achieved also by modifying the CRC processing by adding the channel number to the zero start value used in CRC-processing. The receiver will accept all CRC-error values with a valid channel number and acknowledge on that channel. Invalid channel numbers will be understood as error indications. The efficiency of such integrity checking is complex to understand, and should be verified beneficial for its planned environment.

In a fifth embodiment, two-way frequency hopping can be established in either of the above described ways if the server applies solutions for fast channel scanning. The four above mentioned methods can then be used in a scheme where the master defines its own transmit channel by picking a random channel number by e.g. random generation and then transmits the required receive channel as described in the second embodiment. Use in sensor networks with many sensors (masters) being served by the same server this method is currently demanding, but a possible route to allow more powerful sensors to use high power.

The invention may be implemented in the environment described below, wherein a swarm of sensors communicate as masters with a server that relays the received messages to the cloud, a Cloud Connector.

All communication is initiated from the sensor based on its state. This helps achieve the very low power consumption required for long battery life. To stay connected, all sensors send heartbeat messages at regular intervals, e.g., 15 minutes. If the message is received by a Cloud Connector, it replies with an acknowledging message (ACK) after an agreed delay (e.g., about 1 sec).

If the ACK is not received, the sensor may try to resend the message a few times with some delay, and if not already used, try the more robust (longer range) modulation scheme. If a sensor does not get ACK a number of times, it will enter a "discovery mode" and announce its presence at a low rate until it gets acknowledge from a Cloud Connector. If a sensor is within range of several Cloud Connectors, one of the Cloud Connectors will be defined as its server, giving ACKs to the sensor.

To minimize power usage in the sensors, two modes are defined: "Standard mode" with sufficiently high data rate to allow beneficial use of digitally spread spectrum. This mode is used when not too far from its server. "Boost mode" with lower data rate, increasing the sensitivity to support longer range. This mode cannot beneficially use digitally spread spectrum. To allow the Cloud Connector to respond with high power, Frequency hopping is required.

The messages sent from the Sensor have an encrypted payload and a Message Integrity Check, making bit patterns from a series of messages appear as random data. The CRC value of the sent message is kept as channel frequency for the expected downlink message.

In normal operation, the Sensor reports its presence, potentially carrying observation data (e.g. Temperature) at a minimum rate, planned to be 15 minute interval. A Sensor event (e.g. button action) is reported once observed. Messages are deemed successfully delivered upon reception of downlink message at an agreed frequency.

The Sensor sends ready-messages once ready for reception of further data. Retransmission of unconfirmed transactions: if acknowledge of report is not received, the report will be resent up to two times in the same mode with variable, low delay. If not in boost mode, retransmission in boost mode may be tried up to three times in an embodiment.

Regarding announcement of presence (Discovery mode); until acknowledged by a cloud connector, "probe" messages will be repeated according to a scheme involving both standard mode and boost mode. If repeated boost mode probe messages are acknowledged, there is no frequency hopping. This is an unlikely situation, requiring the sensor not to receive the first acknowledge. With regard to regulations, this is acceptable as the FCC provisions are expected to accept a limited number of repetitions even within 10 sec timeframes.

The cloud Connector operates Standard mode and Boost mode radios in parallel. The Boost mode radios are configured for transmission by frequency hopping over 64 radio channels in the scheme defined by $$fc(n)=f0+df*n$$

where n is a random number in the range 0, 1, ..., 63 and the base frequency f0 and frequency spacing df are given in the product specification. This frequency scheme is the same as defined in the sensors.

The number n is given by the 8-bit CRC value on the received message modulo 64, as used in the Sensor. A test of frequency hopping based on the use of CRC from encrypted messages complies with expectation on randomness:

The Standard mode radios apply sufficient spreading to allow fixed-channel transmission with high power. As the frequency hopping mechanism is in place in the sensor, it may be used for added interference mitigation. A set of 8 channels are specified with its own frequency parameters. The different frequencies are reached by using the 8-bit CRC modulo 8.

2.4.

With respect to CRC processing and conservation of randomness, by the mathematical definition of CRC processing, the CRC is the remainder when dividing the value of a binary number made from the message bit sequence by the CRC polynomial. If any message value has equal probability to occur, then all CRC values have equal probability. For a good encryption, then at least the encrypted part should be randomized quite well, ensuring negligible variation in probability for different CRC values.

On the randomness of the CRC, consider the following: assume a series of messages contain a segment of length N or more bits with random variation, de-correlated to the rest of the message. Then an N-bit CRC processing conserves the random distribution of values, regardless of where the random segment is located. It is sufficient to show that the $2^N$ different values generated in one N-bit sequence results in $2^N$ different CRC values.

The mapping of values does not need to be known. For each transmitted message, there is a mapping of the random sequence R onto the CRC value:

$$CRC = f_M(R)$$

For a specific message, the selected random sequence generates the number R with probability $2^{-N}$ regardless of its value. If the mapping function $f_M(.)$ is not correlated with the random section delivering R, then the generated CRC values maintain the equal probability $2^{-N}$.

The CRC processing needs to be surjective for any possible mapping. This property is granted by a proof of induction: Using the CRC bitwise processing, it can be shown that if we start with the random section of N bits that can have any value, then the section shifted 1 place to the right will assume all possible values as well. Once a set of random $2^N$ values is available with N>=6, then values modulo $2^6=64$ can be used for random hopping on 64 channels.

The value R is described by its binary form $$R = \sum_{i=0}^{N-1} b_i \cdot 2^i.$$

The section generated shifted 1 position towards the end hits a bit value X as LSB, and gets the value $$R' = \sum_{i=0}^{N-2} b_i \cdot 2^{i+1} + xor(b_{N-1}, X).$$

Any combination of values of all the N bits in R are found, regardless of the value of X, so all values of R are re-generated. By induction, each following sequence of N bits shifted one position re-generates all values of R, finally being the CRC value.

Figure 2:
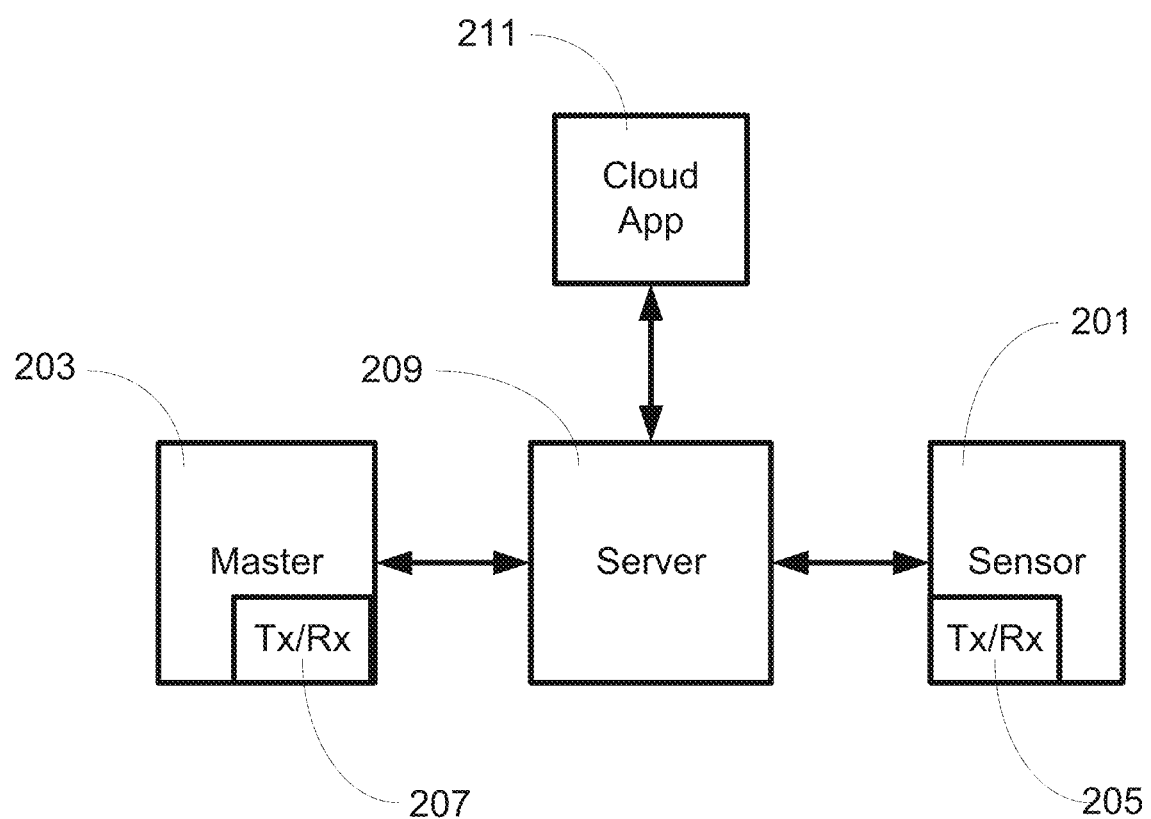
FIG. 2 is a simplified device environment within which embodiments of the disclosed principles may be implemented.

Turning to FIG. 2, this figure shows a simplified device environment within which embodiments of the disclosed principles may be implemented. As shown, the example environment includes a low-power sensor 201, which may itself be a master terminal in some embodiments.

Another master terminal 203 may communicate with the sensor unit 201 or a server 209, which may be a Cloud Connector (gateway) or a device with more available power. The master terminal 203 and sensor 201 each has a respective Rx/Tx facility 207, 205. If the master terminal 203 and sensor 201 initiate all communication, requiring only one return message per transmission, then as noted above, frequency hopping can be implemented at the server 209.

In this embodiment, the master terminal 203 and sensor 201 specify, and transmit to the server 209, the channel to be used for the following reception from the server 209. The master terminal 203 and sensor 201 need only generate channel sequences with random sequence and equal probability for all channels. This helps reduce the energy usage in the master terminal 203 and sensor 201, and the master terminal 203 and sensor 201 can now start the next reception at a known channel without further verification. The server 209 may comprise or be linked to another resource such as a cloud application 211 to further reduce the computational load on, and energy used by, the server 209.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for frequency hopping in a sensor network having a network link between a first endpoint and a second endpoint, the method comprising:
   receiving, by the first endpoint, a first message from the second endpoint,
       wherein the first message is received via a first channel,
   wherein the first endpoint is a sensor, and
   wherein the second endpoint is a server;
   determining, by the first endpoint, a second channel to be used for a reception of a second message from the second endpoint;
   encrypting, by the first endpoint, information identifying the second channel using a cyclic redundancy check (CRC) word;
   transmitting, by the first endpoint, the information identifying the second channel to the second endpoint,
   wherein the information identifying the second channel is transmitted to the second endpoint to cause the second endpoint to decode the CRC word to obtain a number used as a channel number for the second channel; and
   receiving, by the first endpoint and via the second channel, the second message from the second endpoint,
   wherein the second channel is used by the second endpoint for transmission of the second message.

2. The method of claim 1, further comprising:
generating channel sequences with random sequence and equal probability for all available channels.

3. The method of claim 1, further comprising:
receiving traffic from the second endpoint via a higher level for processing.

4. The method of claim 3, wherein the higher level comprises a cloud application.

5. The method of claim 1, wherein a CRC process reports a remainder of a division process of the second message, such that a random variation of message values is convoluted onto the CRC word, maintaining the random variation of message values.

6. The method of claim 1, further comprising:
generating a range of equiprobable channel values using the CRC word by employing a modulo operation by arriving at a power-of-2 number, leading to frequency hopping on all channels.

7. The method of claim 1, further comprising:
generating, using a random number generator, a value in a specified range before each transmission of a message,
wherein the value is stored and is used at next reception and transmitted, adding a sufficient number of bits to an actual transmission, and
wherein the value is used by the second endpoint for next transmission.

8. The method of claim 1, further comprising:
adding a channel number, of the second channel, to a zero start value used in CRC-processing,
wherein the second endpoint accepts all CRC-error values with a valid channel number and transmits an acknowledgment message on the second channel.

9. The method of claim 1, wherein the first endpoint is included in a plurality of sensors that communicate with the second endpoint, and
wherein the server relays messages, received from the plurality of sensors, to a cloud application.

10. The method of claim 1, wherein a first mode and a second mode are enabled to minimize power usage in the first endpoint,
wherein the first mode provides a first data rate to allow beneficial use of digitally spread spectrum,
wherein the first mode is used when the first endpoint and the second endpoint are separated by a short distance,
wherein the second mode supports a second data rate that is less than the second data rate, and
wherein frequency hopping is employed with the second mode.

11. The method of claim 10, wherein probe messages are repeated in the first mode and the second mode until acknowledged by a cloud connector.

12. The method of claim 1, further comprising:
transmitting messages with an encrypted payload and a message integrity check,
wherein the encrypted payload and the message integrity check cause bit patterns from a series of messages to appear as random data, and
wherein the CRC word is kept as a channel frequency for the second message.

13. The method of claim 1, further comprising:
sending ready-messages once ready for reception of further data.

14. A system comprising:
a sensor configured to:
receive a first message from a server,
wherein the first message is received via a first channel;
determine a second channel to be used for a reception of a second message from the server;
encrypt information identifying the second channel using a cyclic redundancy check (CRC) word;
transmit the information identifying the second channel to the server,
wherein the information identifying the second channel is transmitted to the server to cause the server to decode the CRC word to obtain a channel number for the second channel; and
receive, via the second channel, the second message from the server,
wherein the second channel is used by the server for transmission of the second message.

15. The system of claim 14, wherein a length, of the CRC word, is at least 6 bits.

16. A method performed by a first device, the method comprising:
receiving a first message from a second device,
wherein the first message is received via a first channel;
determining a second channel to be used for a reception of a second message from the second device;
encrypting information identifying the second channel using a cyclic redundancy check (CRC) word; and
transmitting the information identifying the second channel to the second device,
wherein the information identifying the second channel is transmitted to the second device to cause the second device to decode the CRC word to obtain a channel number for the second channel, and
wherein the second channel is used by the second device for transmission of the second message.

* * * * *